US007093507B2

(12) United States Patent
Thom et al.

(10) Patent No.: US 7,093,507 B2
(45) Date of Patent: Aug. 22, 2006

(54) PIPETTE CONTROL ARRANGEMENT

(75) Inventors: Paul Thom, Clifton, NJ (US); Douglas W. Harrison, Paterson, NJ (US); Francis Gomes, Jersey City, NJ (US); David Landsberger, Caldwell, NJ (US)

(73) Assignee: Bel-Art Products, Inc., Pequannock, NJ (US)

( * ) Notice: Subject to any disclaimer, the term of this patent is extended or adjusted under 35 U.S.C. 154(b) by 243 days.

(21) Appl. No.: 10/435,863

(22) Filed: May 12, 2003

(65) Prior Publication Data

US 2004/0226389 A1 Nov. 18, 2004

(51) Int. Cl.
*G01N 1/00* (2006.01)

(52) U.S. Cl. .................................................. 73/864.16

(58) Field of Classification Search ............ 73/864.11, 73/864.14, 864.13, 864.16, 864.18; 422/100; 436/180
See application file for complete search history.

(56) References Cited

U.S. PATENT DOCUMENTS 2,517,796 A 8/1950 Mathis
3,660,037 A * 5/1972 Sokol .......................... 422/73
4,257,268 A 3/1981 Pepicelli et al.
4,296,071 A 10/1981 Weiss et al.
4,527,437 A * 7/1985 Wells ...................... 73/864.11
4,926,717 A 5/1990 Gomes
4,988,481 A 1/1991 Jarvimaki et al.
5,090,255 A * 2/1992 Kenney .................. 73/863.02
5,104,624 A 4/1992 Labriola
5,294,405 A * 3/1994 Kenney ...................... 422/103
5,364,596 A 11/1994 Magnussen, Jr. et al.
5,389,341 A * 2/1995 Tuunanen et al. .......... 422/100
5,406,856 A 4/1995 Kuhn
5,509,318 A 4/1996 Gomes
5,616,871 A 4/1997 Kenney
5,650,124 A 7/1997 Gilson
5,696,330 A 12/1997 Heinonen
5,770,159 A 6/1998 D'Autry
5,849,248 A 12/1998 Homberg
5,879,633 A 3/1999 Tervamaki et al.
5,983,733 A 11/1999 Strandberg et al.
6,021,680 A 2/2000 Inagaki et al.
6,299,841 B1 10/2001 Rainin et al.
6,365,110 B1 4/2002 Rainin et al.
6,482,361 B1 11/2002 Suovaniemi

OTHER PUBLICATIONS

Bel-Art Products catalog, Catalog No. 198, pp. 262-289, no date.

* cited by examiner

*Primary Examiner*—Robert Raevis
(74) *Attorney, Agent, or Firm*—Lawrence G. Fridman

(57) ABSTRACT

A pipette control arrangement consists of a housing assembly adapted for operatively housing a pump assembly and for operatively connecting a pipette to the pump assembly via a flexible air tube. The pump assembly is adapted to independently accommodate a plurality of volume specific removable cylinder-plunger systems. The pipette control arrangement may further include a quick release trigger operated mechanism for rapidly and or in large volumes dispensing liquid from an attached pipette.

15 Claims, 8 Drawing Sheets

FIG. 6
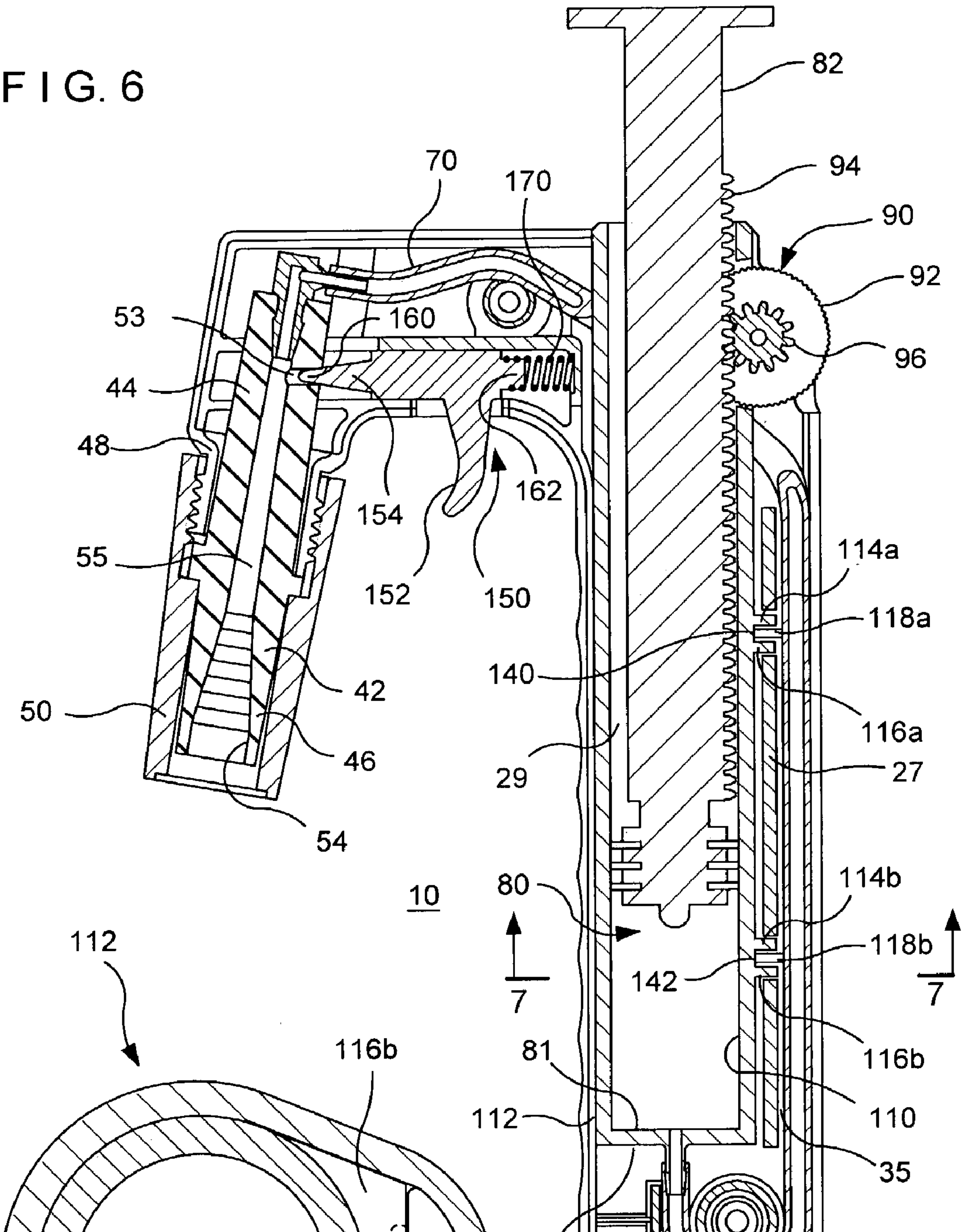
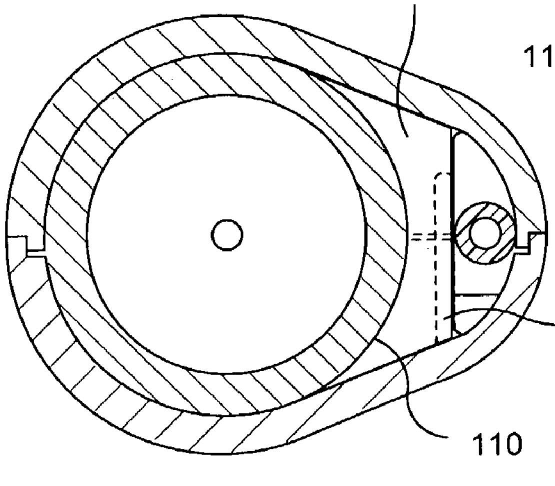
FIG. 7

FIG. 8
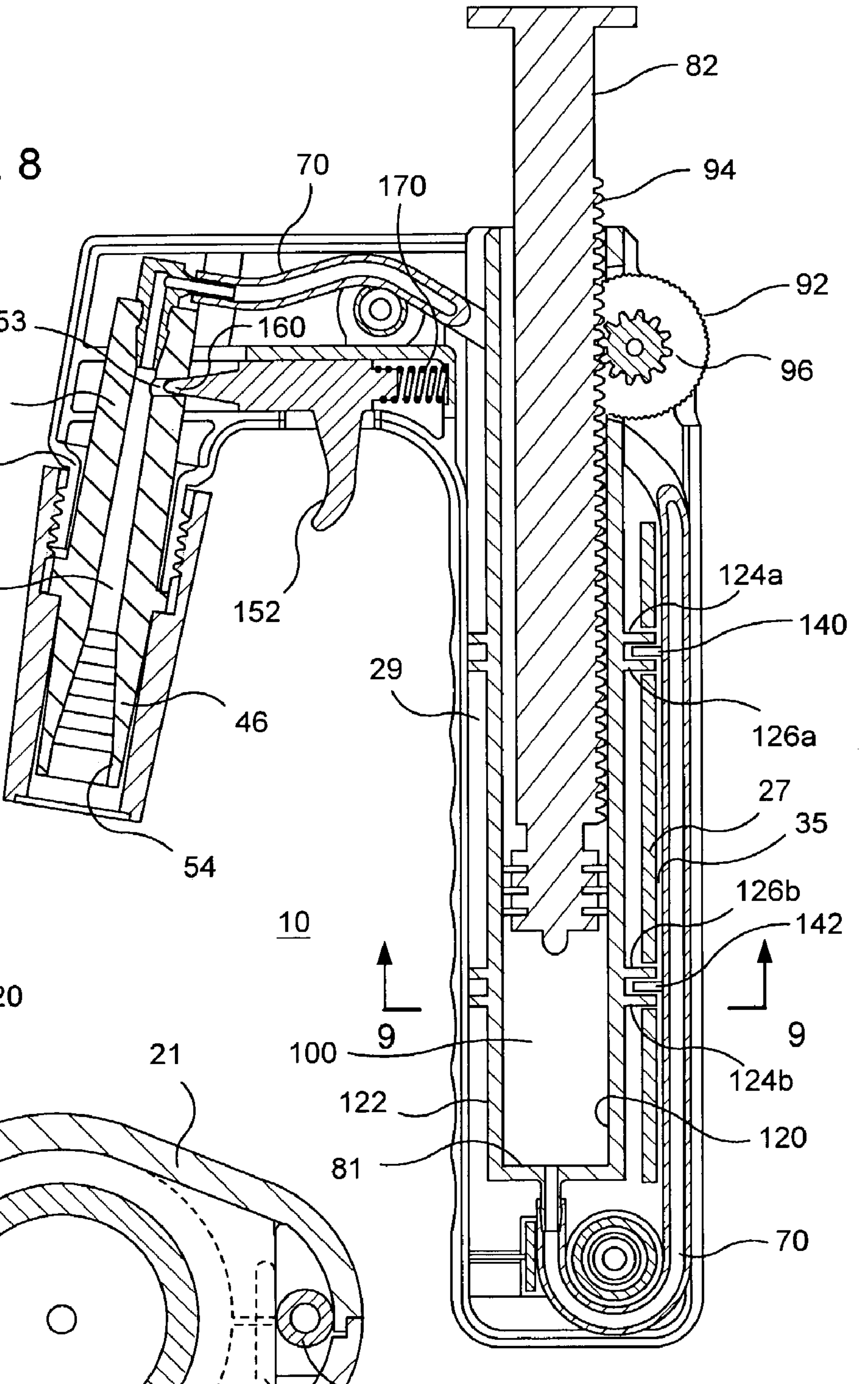
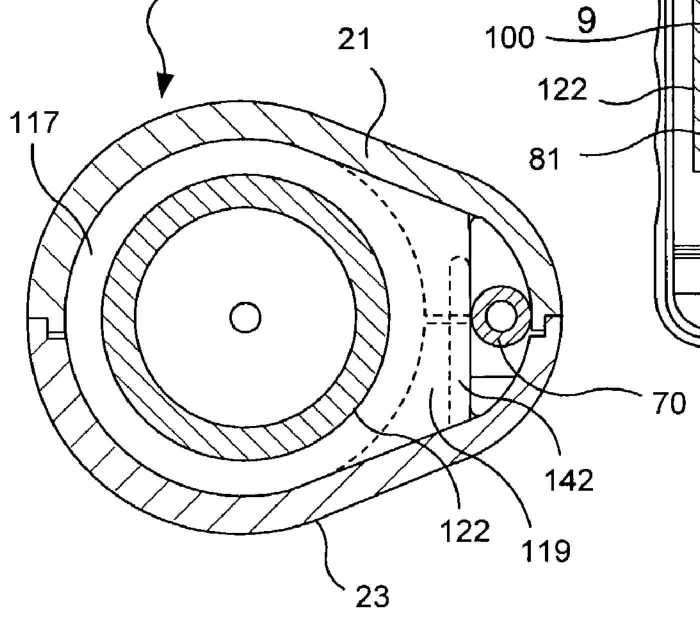
FIG. 9

FIG. 10
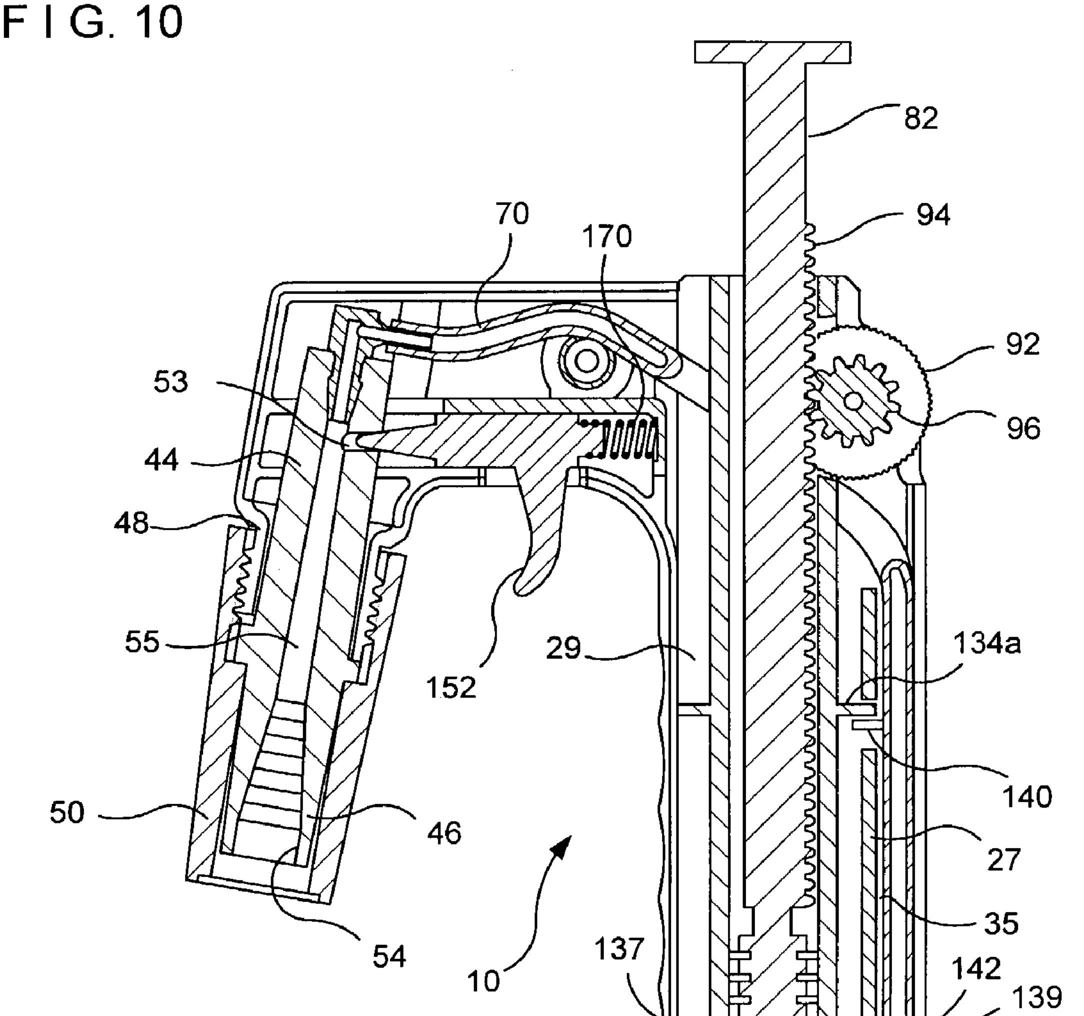
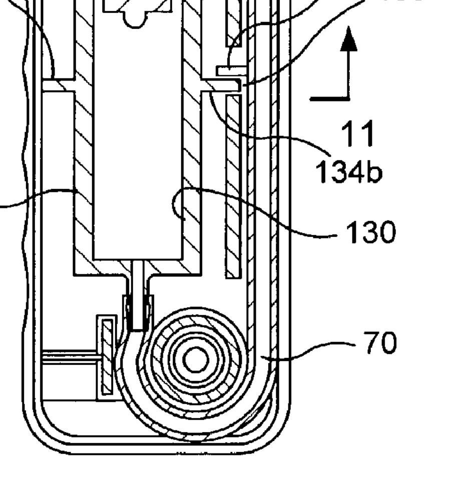
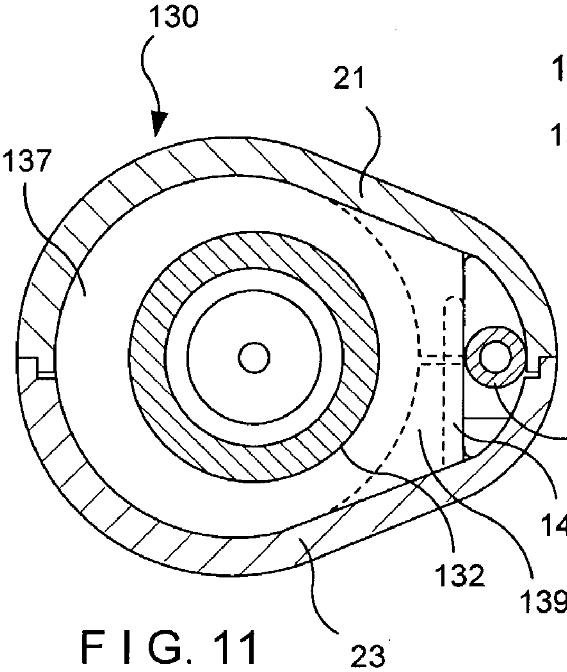
FIG. 11

PIPETTE CONTROL ARRANGEMENT

FIELD OF THE INVENTION

The present invention relates to the field of non-motorized or manually operated pipette control arrangements, and more particularly, to pipette control arrangements capable of accommodating a range of volumetric capacities, pipetting speeds and pipetting accuracy requirements.

BACKGROUND OF THE INVENTION

A typical non-motorized or manually operated pipette control arrangement includes a housing that incorporates a pumping system and a pipette connecting mechanism for either fixedly of removably connecting a pipette to the housing. Some of these arrangements include a thumb operated mechanical system for controlling the aspiration and dispensing of liquids by the pipette.

Various prior art pipette control arrangements exist and are effective in aspirating and dispensing liquids through a pipette. The pipette control arrangements of the prior art, however, generally suffer from one or more drawbacks and limitations that oftentimes render them undesirable or unsuitable for a specific use. Generally these drawbacks and limitations stem from the device being unable to efficiently accommodate a wide variety of volumes of liquid and are therefore limited to certain pipettes having specific volumetric capacities. Furthermore, these devices suffer from the inability to rapidly dispense large volumes of liquid.

By way of example, U.S. Pat. No. 4,527,437 discloses a manually operated pipette control system incorporating a thumb wheel operated mechanical system coupled with a bellows type pumping system. It would be obvious that this device is limited to a certain volume of liquid that may be aspirated and or dispensed by a pipette based upon the dimensions of the bellows pumping system. In addition, it is obvious that even if a user wished to rapidly dispense all or substantially all of the contents of an attached pipette, that the user must repeatedly operate thumb wheel and other mechanical elements associated therewith, until such liquid is dispensed.

Accordingly, there is a well-established need for a pipette control system that avoids the drawbacks and limitations of the prior art. In particular, it would be desirable to provide a pipette control system that is capable of accommodating a plurality of cylinder-plunger pumping systems having a variety of volumetric capacity. Further, it would be desirable to provide a pipette control system that includes a quick release mechanism for rapidly introducing air into and or releasing an existing vacuum in the pipette control system, which allows for the rapid discharge of any liquid present in the pipette. Still further, it would be desirable to provide a pipette control system that is relatively simple and inexpensive in construction and which is adapted for convenient operation by a user.

SUMMARY OF THE INVENTION

Accordingly, it is an object of the present invention to provide a pipette control arrangement which is relatively simple in construction and that is capable of accommodating a plurality of cylinder-plunger assemblies having a varying volume capacity.

It is a further object of the invention to provide a pipette control arrangement that includes a quick release mechanism for rapidly introducing air into and or releasing an existing vacuum in the pipette control system, which allows for the rapid discharge of any liquid present in the pipette.

Still further, it is an object of the invention to provide a pipette control arrangement that includes a simply and inexpensively constructed housing that allows quick and efficient access by an operator to replace or swap out one or more or all of the components of the pipette control system.

Other objects will, in part, be obvious and will, in part, appear hereinafter. The invention accordingly, comprises the features of construction, combination of elements and arrangements of parts, which will be exemplified in the following detailed description and the scope of the invention will be indicated in the claims.

As to another aspect of the invention, the housing assembly has an inverted L-shaped configuration comprising a neck portion and a handle portion.

According to one aspect of the invention, a pipette control arrangement is provided for controlling the volumetric aspiration and or dispensing of liquid from a pipette. The pipette control arrangement consists of a housing assembly and a pump assembly. The pump assembly, which is operatively connected to the housing assembly, is equipped to independently accommodate one of a plurality of volume specific removably connected cylinder-plunger assemblies.

As to another aspect of the invention, the housing assembly has an inverted L-shaped configuration comprising a neck portion and a handle portion.

As to a further aspect of the invention, the pipette control arrangement includes a pipette connecting system operatively connected to the neck portion of the housing assembly for removably connecting a pipette.

As to still another aspect of the invention, the pipette control arrangement includes a quick release spring biased trigger mechanism operatively connected to the pump assembly for rapidly introducing air into and or releasing an existing vacuum pressure in the pipette connecting system, which allows for the rapid discharge of any liquid present in the pipette.

According to still a further aspect of the invention, at least on of the plurality of volume specific removably connected cylinder-plunger assemblies includes a securing arrangement for releasably securing the cylinder-plunger assembly within the housing assembly. The securing arrangement includes at least one fin and or at least one slot arrangement.

According to still another aspect of the invention, the pump assembly includes an adjustable mechanical drive assembly. The mechanical drive assembly includes a thumb wheel pinion assembly and a plunger mounted rack assembly operatively connected to the thumb wheel pinion assembly.

According to still a further aspect of the invention, a pipette control arrangement is provided for controlling the volumetric aspiration and or dispensing of liquid by a pipette. The pipette control arrangement includes a housing assembly that includes a neck portion and a handle portion, a pipette connector assembly, for removably connecting a pipette, a pump assembly that is equipped to independently accommodate one of a plurality of volume specific removably connected cylinder-plunger assemblies and an air tube connected between the pipette connector assembly and the pump housing. The pipette control arrangement further includes a flexible pipette connector and a quick release spring biased trigger mechanism for rapidly introducing air into and or releasing an existing vacuum pressure in the flexible pipette connector, thereby allowing for the rapid discharge of any liquid present in the pipette.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 6 is an enlarged cross-sectional view of a pipette control arrangement showing a first embodiment of a cylinder-plunger assembly;

FIG. 7 is a cross-sectional view of the pipette control arrangement taken along section line 7—7 of FIG. 6;

FIG. 8 is an enlarged cross-sectional view of a pipette control arrangement showing a second embodiment of the cylinder-plunger assembly;

FIG. 9 is a cross-sectional view of the pipette control arrangement taken along section line 9—9 of FIG. 8;

FIG. 10 is an enlarged cross-sectional view of a pipette control arrangement showing a third embodiment of the cylinder-plunger assembly;

FIG. 11 is a cross-sectional view of the pipette control arrangement taken along section line 11—11 of FIG. 10;

DETAILED DESCRIPTION OF THE PREFERRED EMBODIMENTS

For purpose of illustration only, and not to limit generally, the present invention will now be described with specific reference to FIGS. 1–12. It is noted that the drawings of the invention are intended to depict only typical embodiments of the invention, are not necessarily to scale and are merely schematic representations, not intended to portray specific controller parameters on the invention. The invention will now be described with additional specificity and detail through the accompanying drawings.

Figure 1:
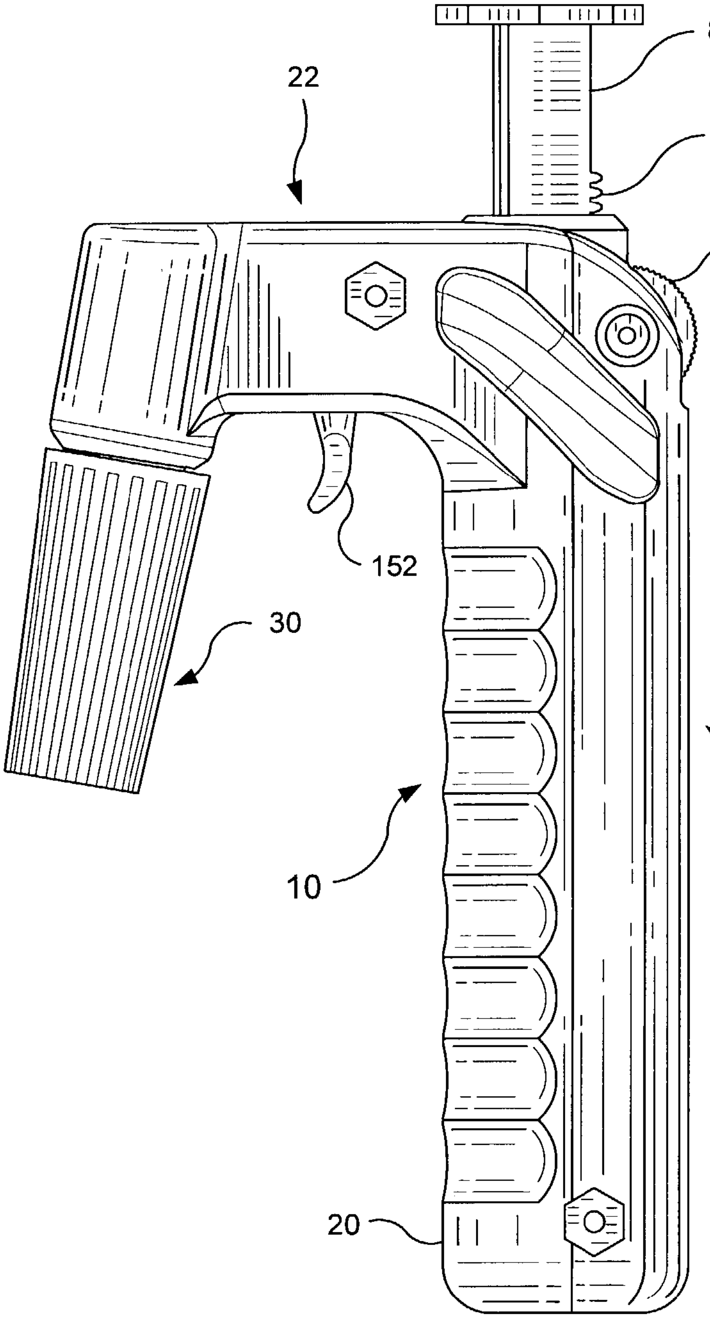
FIG. 1 is a side elevational view of a pipette control arrangement in accordance with one embodiment of the present invention.
Figure 2:
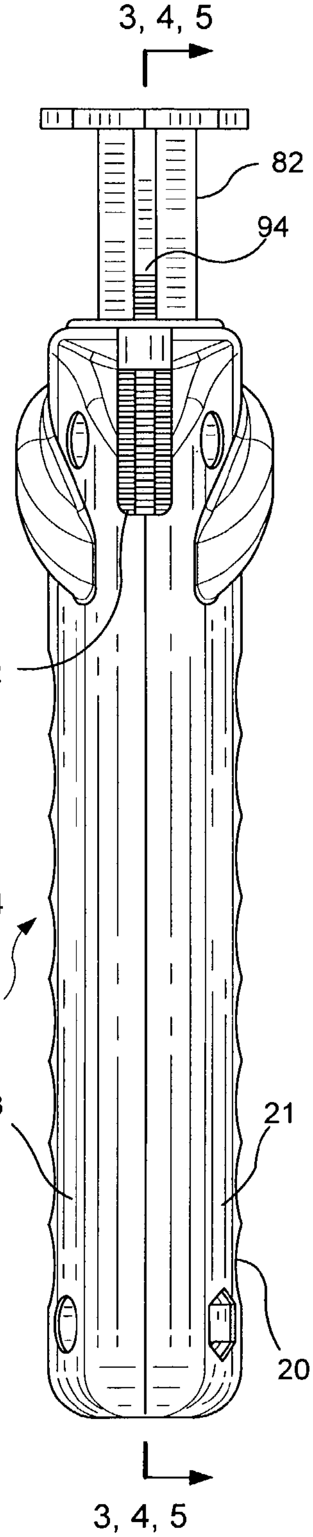
FIG. 2 is a rear elevational view of the pipette control arrangement of FIG. 1.
Figure 3:
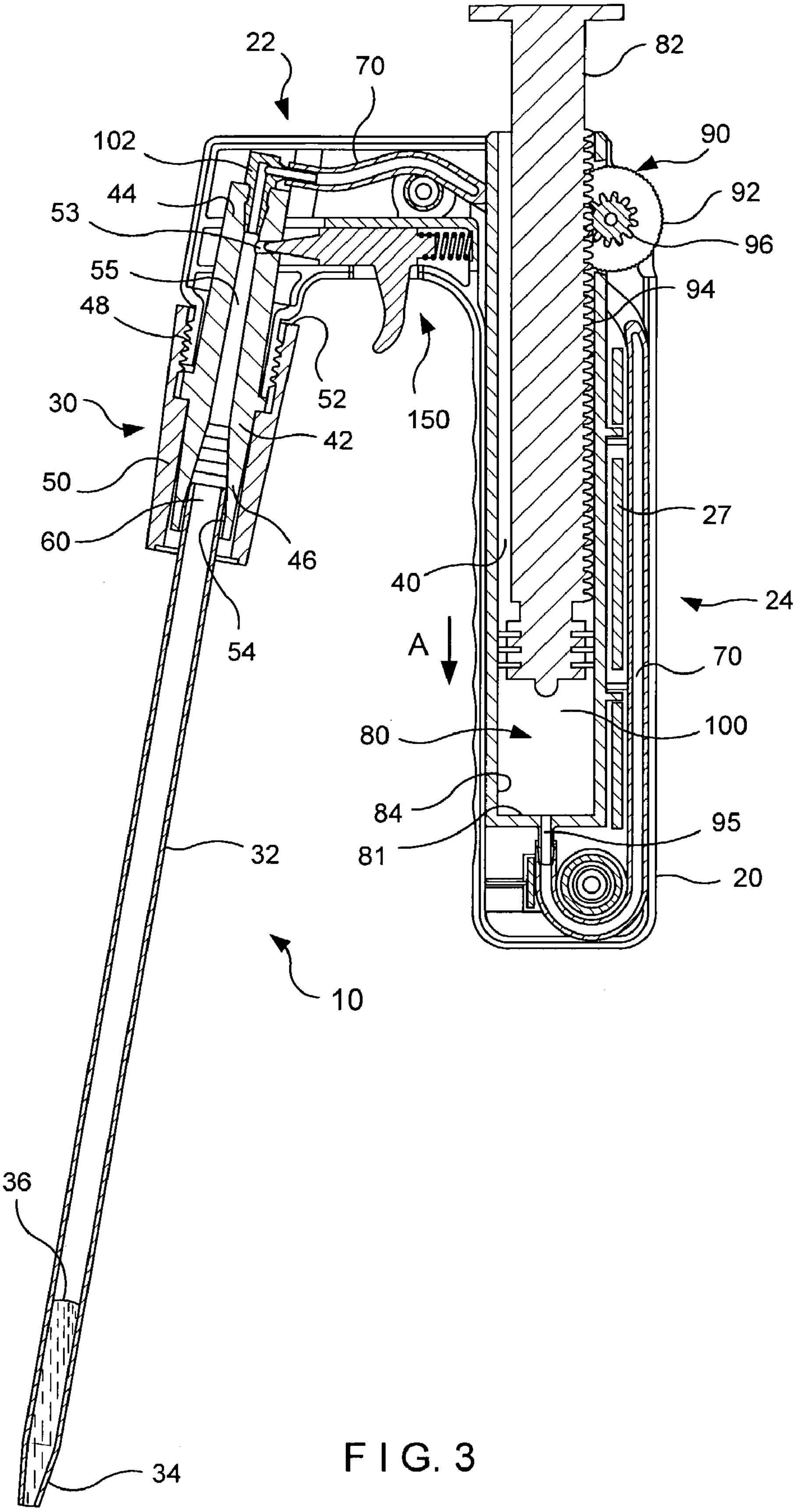
FIG. 3 is cross-sectional view of the pipette control arrangement taken along section line 3—3 of FIG. 2 and showing the arrangement in cooperation with a pipette.

With reference to the Figures, wherein like numerals reference like or corresponding parts throughout the several views, FIGS. 1–3 show a representative embodiment of a pipette control arrangement 10, which is adapted to facilitate accurate pipetting of liquids. The pipette control arrangement 10 includes a housing assembly 20, which is preferably molded of a plastic material and which is preferably formed having a substantially inverted L-shaped configuration with a pistol-type grip. To facilitate assembly of the invention and replacement of its elements, the housing assembly 20 is typically made of two portions or halves 21 and 23. The housing assembly 20 includes a neck portion 22 and a handle portion 24. The pipette control arrangement 10 further includes a pipette connector assembly 30, which is adapted for releasably connecting a pipette 32 to the housing assembly 20 and a pump unit or assembly 40, which controls the volumetric aspiration and distribution of liquids.

The connector assembly 30 is shown outwardly extending from the neck portion 22 of the housing assembly 20. The configuration of the housing assembly provides the user with enhanced control over the motion and positioning of the pipette 32 and more specifically facilitates accurate positioning of a pipette tip 34. In addition, the inverted L-shaped configuration enhances the user's simultaneous visual monitoring of the operation of the pipette control arrangement 10 while monitoring the liquid level 36 in the pipette 32. This ergonomically beneficial configuration also allows the user to maintain a neutral wrist position and minimizes the bending of the wrist up or down or side to side during operation of the pipette control arrangement 10.

In the preferred embodiment, the connector assembly 30 is formed with a flexible pipette connector 42, which is preferably made of a resilient material such as rubber or silicone. The flexible pipette connector 42 is typically defined by a first end 44, which is inserted through an extension opening 48 in the neck portion 22 of housing assembly 20 and a second end 46, which is adapted for operatively receiving the pipette 32. To facilitate attachment of the connector assembly 30 to the neck portion 22 an attachment arrangement, which can be in the form of external threads is provided at the opening 48. A longitudinal channel 55 is provided within the connector 42 inter-connecting the first end 44 and the second end 46. A nose cone 50, having an internally threaded first end 52 releasably secures the flexible pipette connector 42 to housing assembly 20. An operational aperture 53 passes through a wall of the connector 42. We shall revert to this feature later in the application.

With the nose cone 50 attached to the neck portion 22, a mouth end 60 of the pipette 32 is inserted into second end 46 of the flexible pipette connector 42, which includes an expandable opening or channel 54 that can be slightly smaller than the outer diameter of the pipette 32 to be used. When the mouth end 60 of pipette 32 is inserted into the channel 54 of the flexible pipette connector 42, the channel 54 expands outward and the resiliency of the material operatively holds the pipette 32 tightly in place. In addition, a seal is formed between the flexible pipette connector 42 and pipette 32, which prevents the leakage of outside air into the pipette control system 10 and the subsequent leakage of liquid from the pipette tip 34.

The pipette connector assembly 30 also serves to position and stabilize the pipette and may include an optional filter (not shown), such as a membrane or hydrophobic filter. As shown in the drawings, the pipette connector assembly 30 is fixed to the neck 22 of housing assembly 20 so as to hold the attached pipette 32 in a position that can be substantially parallel and proximate to the handle portion 24. Alternatively, the pipette connector assembly 30 may be attached to the neck of the housing assembly 20 by other arrangements. For example, it can be attached by a swivel fitting, enabling the user to change the angle between the pipette 32 and the handle portion 24.

In the preferred embodiment, the pump assembly 40 provides a low pressure vacuum source that aspirates or draws liquid into the pipette 32, and a high pressure air source that facilitates dispensing of aliquots of liquid from the pipette 32 into a series of wells for testing. The pump assembly 40 is operatively connected to the first end 44 of the flexible pipette connector 42 via a connecting arrangement or air tube 70.

Among major elements of the pump assembly 40 are a cylinder-plunger sub-assembly or unit 80 and a mechanical drive system 90 associated therewith. The cylinder-plunger sub-assembly or unit 80 consists of a plunger 82, which is slidably movable within a substantially hollow cylinder 84. This motion is resulted in compression or expansion of air situated in an operational chamber 100 formed within an internal space of the cylinder 84 between the plunger 82 and the bottom 81 of the cylinder. The mechanical drive system 90 includes a thumb wheel 92, which is coaxially connected with a pinion 96 adapted for engagement with a rack member 94. As clearly illustrated, the rack formation 94 forms a portion of the plunger 82. The thumb wheel 92 is adapted for rotational motion and is both arranged within the interior of the handle portion 24 and exposed to the exterior of the housing assembly 20, so as to be conveniently accessed by fingers of a user. In operation, the mechanical drive system 90 is adapted for conversion of the rotational motion of the thumb wheel 92 and the pinion 96 associated therewith to the translational motion of the rack formation 94 and the plunger 82 in a longitudinal direction. It should be noted that, although in the preferred embodiment of the invention the mechanical drive system 90 is in the form of a rack and pinion combination, utilization of other forms of driving arrangements is also contemplated. For example, the mechanical drive system 90 can be in the form of a gear train.

When the thumb wheel 92 and the pinion 96 are rotated in one direction (counter-clockwise in the present example), their motion is translated in the motion of the rack 94 and the plunger 82 within the cylinder 84 toward the bottom portion thereof 81 (illustrated by the arrow A), so as to decrease the open space or operational chamber 100 formed thereinside. This motion compresses the air, which upon exiting the cylinder 84, passes through the flexible air tube 70 or other air connecting arrangement and is directed to the flexible pipette connector 42. Furthermore, the compressed air passes through the longitudinal channel 55 of the flexible pipette connector 42 and acts to incrementally discharge the liquid positioned within the pipette 32. On the other hand, when the thumb wheel 92 and the pinion 96 are rotated in the opposite direction (clockwise in the present example), the plunger 82 is moved away from the bottom portion 81 of the cylinder 84 (as illustrated by the arrow B), so that the operational chamber 100 is expanded forming a low pressure or vacuum zone thereinside. In this motion air or gas is allowed to enter and accumulate in the space of the operational chamber 100 between the bottom portion 81 of the cylinder 84 and the plunger 82. In view of the restrictive nature of an outlet 95, the downward motion of the plunger 82 (according to the arrow A) causes gradual compression and discharge of air or gas from the operational chamber 100, which is resulted in the increased resistance to the downward motion thereof. Thus, the downward motion (according to the Arrow A) of the plunger 82 is being slowed down by the action of the compressed air or gas, so as to discharge the liquid from the pipette in a controlled manner. This, in turn prevents the excessive rate of dispensing of liquid from the apparatus of the invention when the thumb wheel 92 and drive system 90 are utilized.

Figure 4:
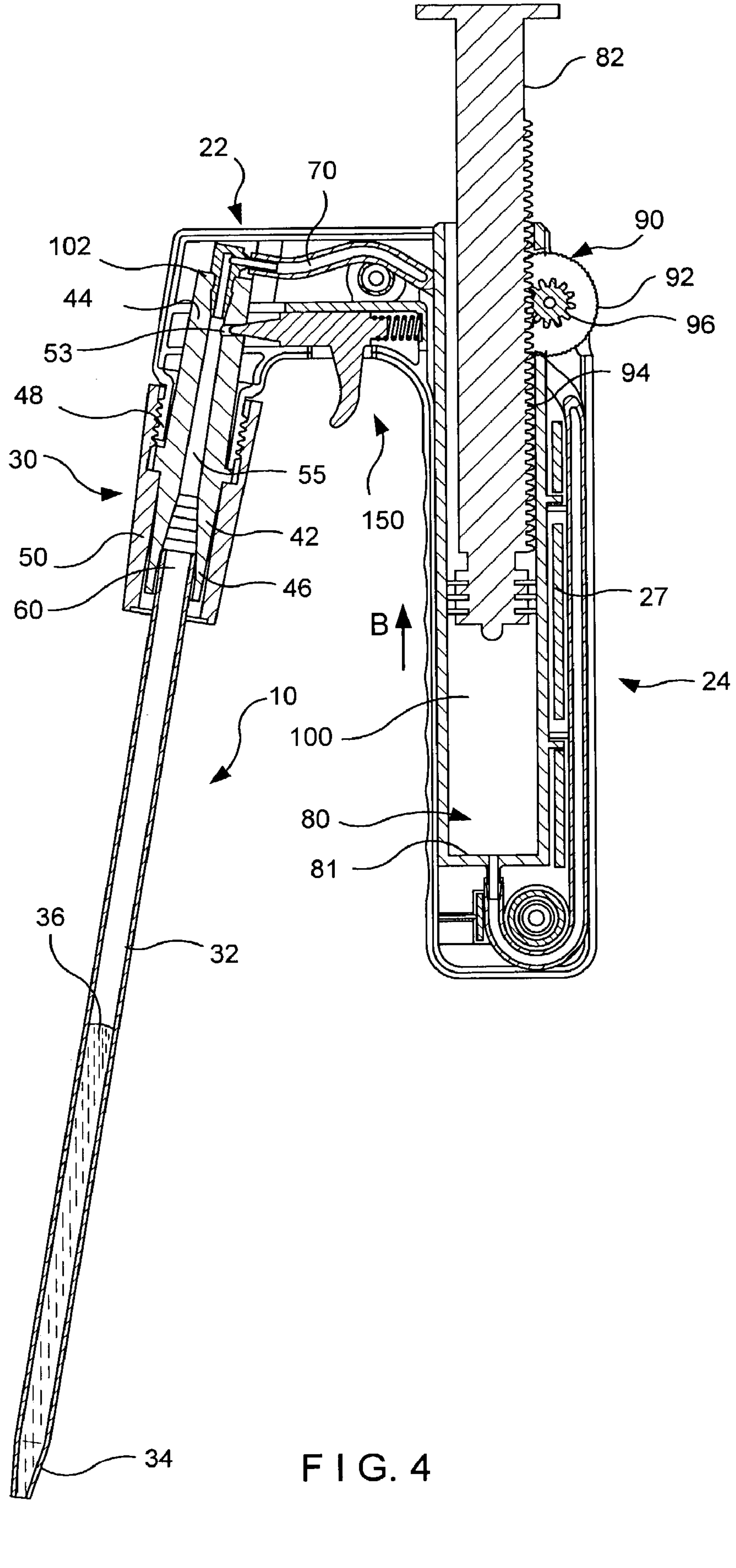
FIG. 4 is cross-sectional view of the pipette control system taken along section line 4—4 of FIG. 2 and showing the arrangement in cooperation with a pipette.
Figure 5:
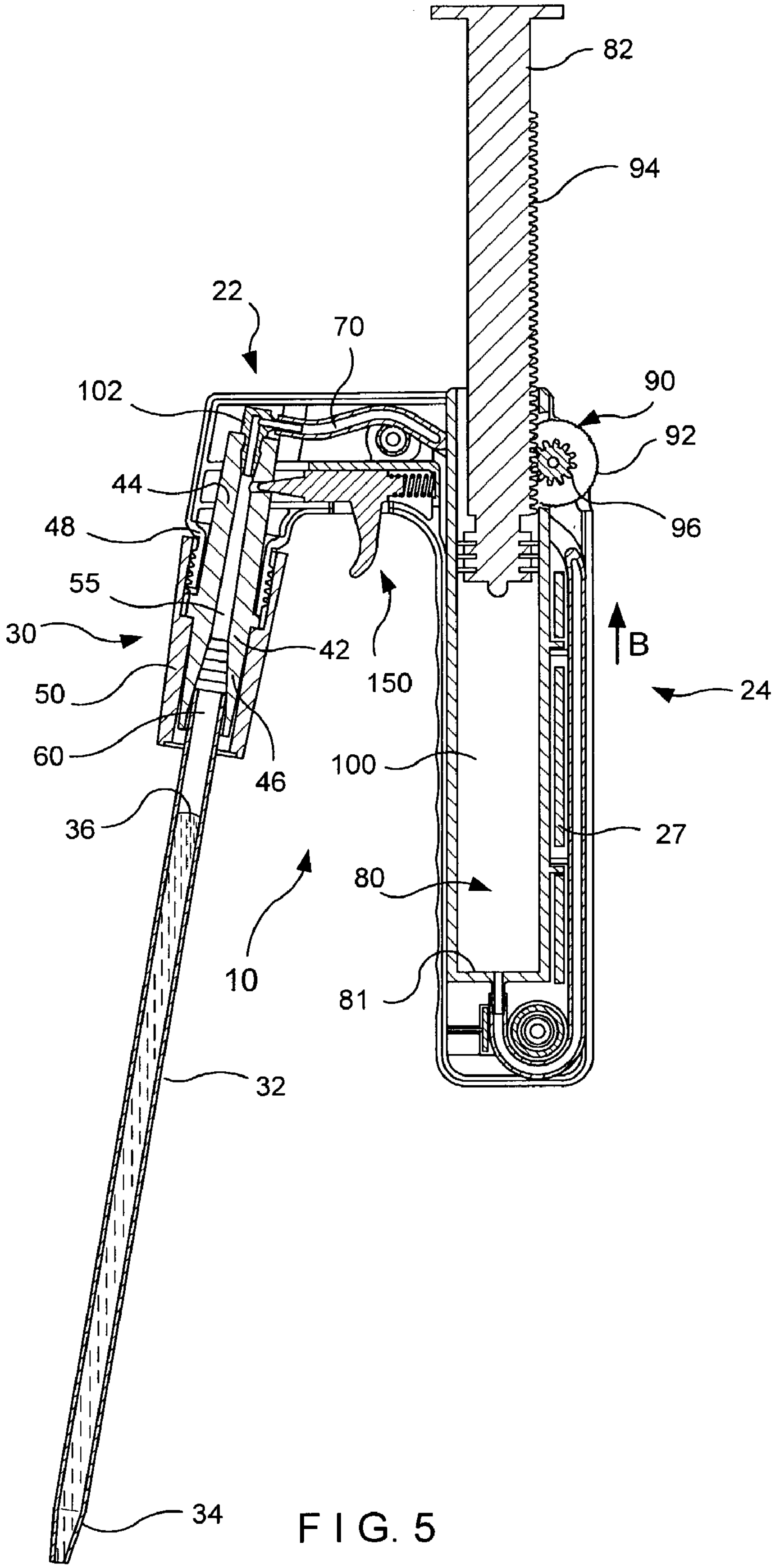
FIG. 5 is cross-sectional view of the pipette control system taken along section line 5—5 of FIG. 2 and showing the arrangement in cooperation with a pipette.

As illustrated in FIGS. 3–5, a suction action is achieved when the thumb wheel 92 is rotated in the opposite (or clockwise) direction causing the plunger 82 to move away from the bottom 81 of the cylinder 84 in the direction of the arrow B. In this motion the space of the operational chamber 100 within the cylinder 84 increases, so as to facilitate formation of a reduced pressure zone or vacuum thereinside. These vacuum forces are conveyed through the connecting arrangement or flexible air tube 70 and extend into the longitudinal channel 55 of the flexible pipette connector 42 via an aperture 102 in the first end 44. The reduced pressure zone or vacuum creates suction within the flexible pipette connector 42, resulted in the aspiration or drawing of liquid into the pipette 32 from an outside container. In this manner liquid is directed upwardly, thereby partially or completely filling the pipette 32.

In the laboratory environment, the amount of liquid that is drawn into the pipette 32 and subsequently discharged therefrom often has to be very carefully calibrated. This means that in certain operational steps, the pipette control system 10 should be capable of accurately accepting and discharging a very precise volume of the liquid. Because the speed and/or amount of rotational motion of the thumb wheel 92 controls how much or how fast the liquid is drawn or dispensed, the sensitivity and accuracy of the pump assembly 40 may be selected and or adjusted to fit the user's needs by changing certain characteristics of the mechanical drive system 90. For example, this can be adjusted by changing the gear ratio between the thumb wheel 92 and the mechanical rack assembly 94. In certain embodiments of the invention, the thumb wheel 92 is removable in nature, which provides the user with an option of using various rack-pinion arrangements having different driving ratios.

As a way of example, in certain embodiment of the present invention, the thumb wheel 92 is coaxially coupled with a pinion 96 having a substantial number of gear teeth, whereas in other embodiments a second thumb wheel (not shown) may be coaxially connected with a pinion (not shown) having fewer gear teeth. Although in each of the embodiments, the pinions are engaged to the same mechanical rack assembly 94, a rotational motion of the first thumb wheel results in a different degree of translational movement of the plunger 82 than would the same degree of rotational motion of the second thumb wheel.

It should be noted that other methods for controlling the precision of the pipette control system 10 are contemplated. For example, the thumb wheel and pinion assembly may be held constant while certain characteristics of the mechanical rack assembly are adjusted, thereby allowing a user to achieve similar ranges and control of plunger motion and therefore similar ranges of pipetting accuracy as above-described.

Significantly, as best illustrated in FIGS. 6–11, in addition to being able to adjust the accuracy of the pipette control system, the versatility of the invention is enhanced when the user can adjust capacity of the device for a particular volume of liquid to be pipetted. The housing assembly 20 of the pipette control arrangement 10 in general, and more specifically the interior of the handle portion 24 is formed, so as to be capable of accommodating various types of cylinder-plunger units or assemblies, wherein each unit or assembly is formed having a predetermined volumetric capacity.

In the preferred embodiment of the invention the interior part of the handle portion is adapted to accommodate at least the following three types of cylinders: a first cylinder having the internal or working volume of about 25 ml.; a second cylinder having the approximate internal or working volume of 10 ml.; and a third cylinder having the internal or working volume of about 2 ml. Although the preferred embodiment of the invention will be described with reference to these three types of cylinders, it should be obvious that utilization of the invention with numerous other cylinders is also contemplated. As best illustrated in FIGS. 3–7, the first cylinder 110 having the largest volumetric capacity fits snugly within the interior region of the handle portion 24 of the housing assembly 20. On the other hand, the outside periphery and/or diameters of the other cylinders 120 and 130 (see FIGS. 8–11, for example) are smaller than the outer diameter of the first cylinder 110. However, to provide the reliable operation of the device of the invention, these smaller cylinders should be stably received within the same interior region of the handle portion 24 in the same manner as the large cylinder 110. In order to compensate for an additional space between the smaller cylinders and the interior of the handle portion, the smaller cylinders 120 and 130 are fixedly positioned within the interior of the housing by means of a special securing arrangement as described hereinbelow.

In order to properly accommodate the components of the invention, the interior of the handle portion 24 is separated by a longitudinal partitioner 27 into a main section 29 typically having an arc-shaped cross-section and an auxiliary section 35. As clearly illustrated in the assembled condition of the invention, the main section 29 is mainly adapted to accommodate the cylinders 110, 120, 130, whereas the auxiliary section 35 is adapted to receive a portion of the air tube 70 longitudinally extending within the handle portion 24. The first cylinder 110 has a substantial outer diameter 112, such that it occupies almost the entire or a significant portion of the curved interior part of the main section 29 of the handle portion 24 (see FIGS. 3–6). A second cylinder 120 and a third cylinder 130 are formed having substantially smaller outer diameters 122, 132 compared with the outer diameter 112 of the first cylinder. However, all cylinders must occupy the same main section 29 of the interior area of the handle portion 24. The smaller cylinders 120, 130 are formed with the securing arrangement, so as to be received in the same manner as the first cylinder 110 within the interior of the handle portion 24. As illustrated in FIGS. 6–11, this securing arrangement is in the form of flanges or fins extending outwardly from the exterior wall of each cylinder. In the preferred embodiment of the invention, the smaller cylinders 120, 130 are each formed with at least a pair of flanges or fins 124*a*, 124*b* and 134*a*, 134*b* extending outwardly therefrom. As clearly illustrated in the cross-sectional views of FIGS. 9 and 11, each fin of the securing arrangement is formed with a stabilizing, arcuatly-shaped part 117, 137 which is adapted to stabilize the smaller cylinders within the curved interior main section 29, and an engaging part 119, 139 which is adapted for engagement with the restrictive ribs 25 extending from an inner wall over the interior of the handle portion 24. The main function of the engaging parts 119, 139 is to prevent, upon their engagement with the restrictive ribs 140, 142, longitudinal movement of the respective cylinder within the interior part of the handle portion 24. On the other hand, the main function of the stabilizing parts 117, 137 is to compensate for an extra space which became available upon positioning of the smaller cylinders within the main section 29 and to prevent, in combination with the engaging parts, movement of the respective cylinder in the transverse direction. Obviously various combinations of the fins or flanges can be accommodated by the invention. For example, to provide better stability the second or intermediate cylinder 120 includes a second pair of fins 126*a*, 126*b* (see FIG. 8).

Referring now to FIG. 6, the first cylinder 110 is formed with two pairs of fins 114*a*, 116*a* and 114*b*, 116*b*, similar to that of the smaller size cylinders, which operatively form a pair of receiving portions or slots 118*a*, 118*b*. The slots 118*a*, 118*b* engage a pair of restrictive ribs or fins 140, 142 extending from the interior of the handle portion 24 and operated to securely seat the first cylinder 110 within the housing assembly 20. It should be noted that a reverse fin/slot arrangement is also contemplated. For example, the interior of the handle portion can be formed with two slots or receiving arrangements for operatively receiving fins provided on the exterior of the first cylinder 110.

Formation of the housing assembly 20 having two portions or halves 21, 23 facilitates replacement or substitution of the components of the invention such as the pump assembly 40, the air tube 70 and/or the pipette connector assembly 30. Replacement of these elements may be necessitated by contamination thereof by liquid from the pipette 32, ordinary wear or, as discussed hereinabove, when different capacity or volume of cylinder-plunger arrangement is needed. The pump assembly 40, connecting arrangement or air tube 70 and pipette connector assembly 30 may be manufactured as disposable items and arranged to be readily detachable from one another to facilitate their replacement in the pipette control system 10.

Figure 12:
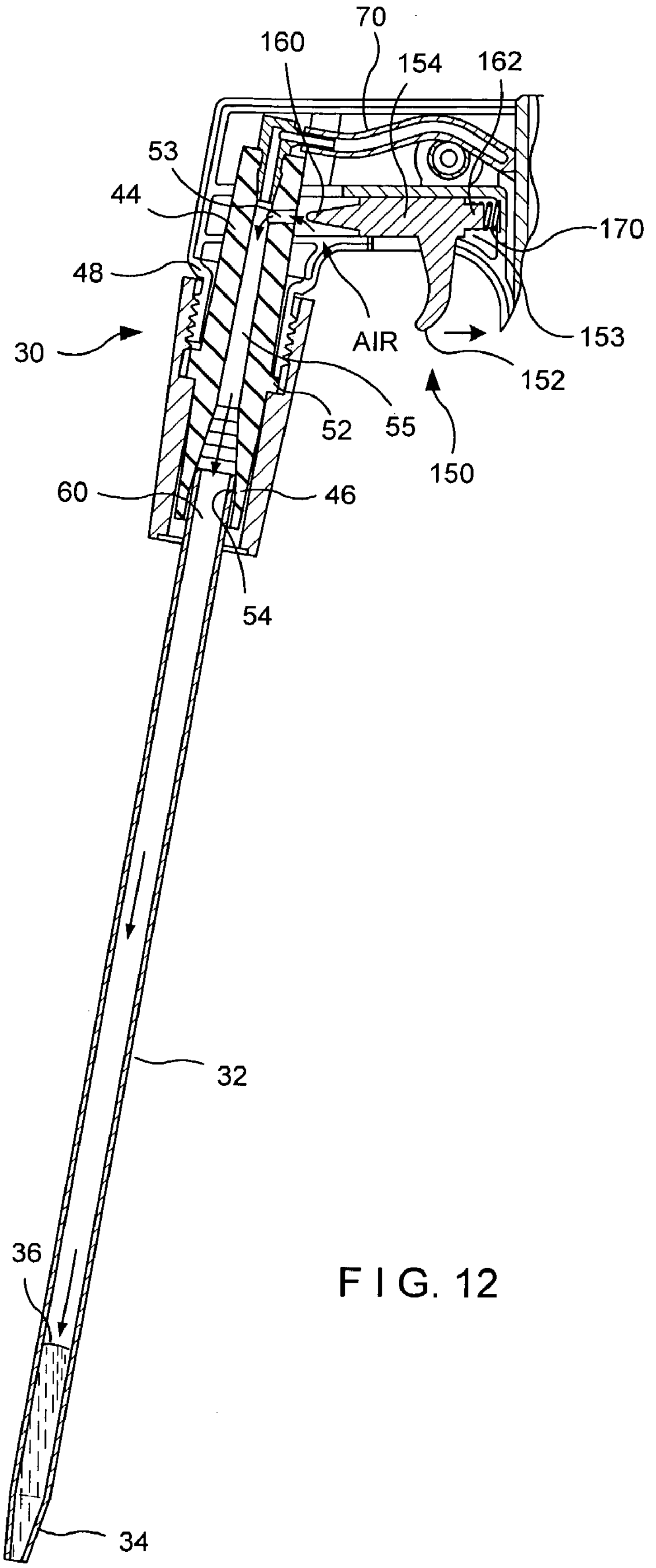
FIG. 12 is a fragmentary, cross-sectional view of a pipette control arrangement showing a quick release trigger mechanism in operation.

Referring now to FIG. 12, wherein an alternate embodiment of the present invention is shown. When precise measurements of a liquid are needed during the dispensing process, the above-discussed thumb-wheel arrangement 92 associated with the mechanical drive system 90 is utilized. In this manner the liquid can be dispensed in a controlled, drop by drop fashion. However, in certain situations, when a substantial or entire volume of a column of liquid has to be released quickly from the pipette tube 32, a quick release mechanism 150 (see FIG. 12, for example) is activated.

The quick release mechanism 150 includes a plug or engaging member 151, formed with a first engaging end 160 operatively associated with the pipette connector assembly 30 and a second engaging end 162 operatively associated with a biasing member or spring arrangement 170. A trigger 152 extends outwardly from the plug or engaging member 154, so as to pass through a wall of a guiding chamber 153. The engaging plug or member 154 is adapted for slidable movement between open and closed positions and vice versa in the direction transverse to the longitudinal channel 55 within the guiding chamber 153 formed at a bottom area of the neck portion 22. In the closed position of the quick release mechanism, the first end 160 is adapted to be snugly received within and sealingly close the operational aperture 53 provided within the flexible pipette connector 42. Thus, when the pipette 32 is at least partially filled with the liquid, the operational passage of the apparatus of the invention, which encompasses the interior area of the pipette 32, the longitudinal channel 55 and the air tube 70 is sealed from an outside environment. This condition is required for the gradual discharge of the liquid by means of operation of the thumb-wheel arrangement 92. When the quick release mechanism 150 is actuated by a user pulling the trigger 152, and the plug or engaging member 154 is moved from the closed to the open position thereof, causing the compression of the spring arrangement 170, so as to allow the first engaging end 160 to disengage the operational aperture 53. This enables the longitudinal channel 55 formed in the interior of the flexible pipette connector 42 to communicate with the ambient atmosphere. Upon ambient air entering the interior of the flexible pipette connector 42, the vacuum existing in the operational passage is released. In this manner the forces of gravity facilitate quick dispensing of a liquid from the pipette 32.

In order to return to the controlled handling of liquid by the thumb-wheel arrangement 92, associated with the mechanical drive system 90, the trigger 152 is released. In this condition the biasing member or spring 170 presses the plug or engaging member 154 toward the pipette connector assembly 30 and the first engaging end 160 sealingly closes the operational aperture 53 in the flexible pipette connector 42. Thus, the vacuum or low pressure condition can be re-established in the operational passage of the apparatus.

As indicated hereinabove, in certain situations to accommodate the requirements of a testing process, it is desirable to quickly dispense substantially the entire amount of aspirated liquid contained in the pipette 32. In these instances, in addition to increasing pipetting speed, it is ergonomically beneficial to allow a user to rapidly purge liquid from the pipette without having to repeatedly operate the thumb wheel, as discussed hereinabove. For this and other reasons, the quick release mechanism 150 can be efficiently utilized, so as to release the vacuum within the pipette connector assembly 30 and the pipette 32. By actuating a trigger 152, a plug 154, which seals the pipette connector assembly 30, is pulled back. This motion opens the operational aperture 53 in the flexible pipette connector 42 and releases the vacuum, so that the gravity takes over and it releases/discharges the liquid out of the pipette 32.

Although the invention has been described with reference to the specific embodiments, those skilled in the art will recognize that changes can be made in the form and detail without departing from the spirit and the scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A pipette control arrangement comprising:

a housing assembly;

a pump assembly operatively connected to the housing assembly;

a pipette connector operatively connected to the pump assembly and adapted to operatively receive a pipette;

a quick release mechanism for rapidly discharging at least a portion of a liquid from the pipette, the quick release mechanism having an engaging plug with at least a first engaging portion provided for engagement with and disengagement from the pipette connector, so as to define respective closed and open positions of the pipette connector in such a manner that in the closed position the first engaging portion engages the pipette connector and in the open position the first engaging portion is released from its engagement with the pipette connector, and a mechanical drive assembly provided to discharge the liquid in the closed position of the pipette connector, the mechanical drive assembly includes a thumb wheel pinion sub-assembly and a plunger mounted rack sub-assembly operatively connected to the thumb wheel pinion sub-assembly.

2. The pipette control arrangement according to claim 1, wherein the quick release mechanism further comprises the engaging plug having a second engaging portion operatively associated with a biasing member; and the engaging plug is adapted for slidable movement between the open and closed positions of the pipette connector.

3. The pipette control arrangement according to claim 2, wherein the pipette connector is made of a flexible material and an operational opening is provided within a wall of the pipette connector; the engaging plug is adapted for a slidable movement in the direction substantially transverse to the longitudinal axis of the pump assembly.

4. The pipette control arrangement according to claim 3, wherein upon actuation of the quick release mechanism the engaging plug is moved from the closed to the open position thereof causing compression of the biasing arrangement, so as to allow the first engaging portion to disengage the operational aperture in the flexible pipette connector and to admit air into the flexible pipette connector.

5. The pipette control arrangement according to claim 3, wherein to move the engaging plug from the open to the closed position the biasing member presses the second engaging portion toward the flexible pipette connector, so as to enable the first engaging portion to sealingly close the operational aperture of the flexible pipette connector.

6. A pipette control arrangement comprising:

a housing assembly having a handle with an interior portion, said interior portion formed with at least one restrictive member extending outwardly therefrom;

a pump assembly operatively connected to the housing assembly, the pump assembly is adapted to accommodate a plurality of volume-specific cylinder-plunger units, each said cylinder-plunger unit having a cylinder defined by an exterior thereof, at least one securing arrangement associated with the exterior of the cylinder for fixedly positioning each said volume-specific cylinder-plunger unit within the interior portion of the handle;

said at least one securing arrangement comprises a stabilizing part for stabilizing the cylinder-plunger unit within the interior portion of the handle and an engaging part adapted for engagement with said at least one restrictive member, and said pump assembly includes a mechanical drive assembly including a thumb wheel pinion sub-assembly and a plunger mounted rack sub-assembly operatively connected to the thumb wheel pinion sub-assembly;

whereby said engaging part is adapted to prevent longitudinal movement of the cylinder-plunger unit within the interior portion of the handle and said stabilizing part is adapted to prevent transverse movement of the cylinder-plunger unit within the interior portion of the handle.

7. The pipette control arrangement according to claim 6, further comprising a pipette and a pipette connecting arrangement adapted to operatively connect the pipette with the cylinder-plunger unit.

8. The pipette control arrangement according to claim 7, wherein the housing assembly is formed having an inverted L-shaped configuration.

9. The pipette control arrangement according to claim 6, wherein said at least one securing arrangement comprises at least a pair of spaced from each other securing members extending outwardly from the exterior of the cylinder.

10. The pipette control arrangement according to claim 9, wherein said at least a pair of the securing members is adapted to receive the restrictive member therebetween.

11. The pipette control arrangement according to claim 6, further comprising a pipette connector formed with a first end operatively connected to the pump assembly by a connecting arrangement and a second end adapted to operatively receive a pipette; and a quick release mechanism for rapidly discharging at least a portion of a liquid from the pipette.

12. The pipette control arrangement according to claim 11, wherein the quick release mechanism further comprises a plug having a first engaging portion adapted for engagement with the pipette connector and a second engaging portion operatively associated with a biasing member; the plug is adapted for slidable movement between open and closed positions, so that in the closed position the first engaging portion engages the pipette connector and in the open position the first engaging portion is released from its engagement with the pipette connector.

13. The pipette control arrangement according to claim 12, wherein the pipette connector is made of a flexible material and an operational opening is provided within a wall of the pipette connector; the plug is adapted for a slidable movement in the direction substantially transverse to the longitudinal axis of the handle portion.

14. The pipette control arrangement according to claim 13, wherein upon actuation of the quick release mechanism the plug is moved from the closed to the open position thereof causing compression of the biasing arrangement, so as to allow the first engaging portion to disengage the flexible pipette connector.

15. The pipette control arrangement according to claim 13, further comprising the flexible pipette connector having an operational aperture, wherein to move the plug from the open to the closed position the biasing member presses the second engaging portion toward the flexible pipette connector, so as to enable the first engaging portion to sealingly close the operational aperture of the flexible pipette connector.

* * * * *